C. W. ECKERMAN.
SHOCK ABSORBER FOR TYPEWRITING MACHINES.
APPLICATION FILED FEB. 26, 1917.

1,350,014.

Patented Aug. 17, 1920.

Inventor
Charles W. Eckerman

By Harry C. Schroeder
Attorney

UNITED STATES PATENT OFFICE.

CHARLES W. ECKERMAN, OF ALAMEDA, CALIFORNIA.

SHOCK-ABSORBER FOR TYPEWRITING-MACHINES.

1,350,014.  Specification of Letters Patent.  Patented Aug. 17, 1920.

Application filed February 26, 1917. Serial No. 151,056.

*To all whom it may concern:*

Be it known that I, CHARLES W. ECKERMAN, citizen of the United States, residing at Alameda, in the county of Alameda and State of California, have invented certain new and useful Improvements in Shock-Absorbers for Typewriting-Machines, of which the following is a specification.

My invention relates to shock absorbers and consists in a new and useful combination of metal parts and shock absorbing material, especially adapted for use on typewriting or adding machines, check protectors and similar devices.

Referring to the drawing which forms part of this specification and the appended claims:

Figure 1 shows a side elevation of the shock absorber.

Fig. 2 a sectional elevation.

Fig. 3 a top view or plan of the same.

Figure 1:
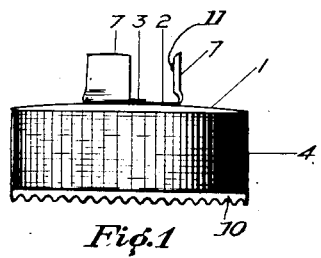

My invention consists in a metal disk 1, to which is riveted a clamp 2 by rivet 3, the clamp consisting of metal adapted to be fitted over the customary rubber supporting knobs 8 with which typewriters are equipped.

The shank of rivet 3, with which disk 1 and clamp 2 are riveted together consists of a hollow cylinder, which, upon being pushed through pad 4, splits in two or more parts 5 thereby firmly clamping and compressing the center part of pad 4, and thereby providing a central recess 6 in the bottom of the pad so as to distribute the weight of the typewriting machine over the outer portion of the pad principally.

Disk 1, being slightly arched, as shown, helps to relieve all pressure from the center of pad 4. Lips 7 of clamp 2, being of somewhat elastic material, hold onto the rubber supporting knobs 8 of the typewriter firmly and permit lifting of the machine without the shock absorbers dropping off the knobs.

Figure 2:
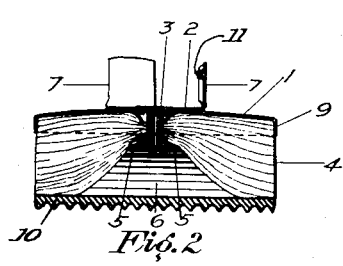
Figure 3:
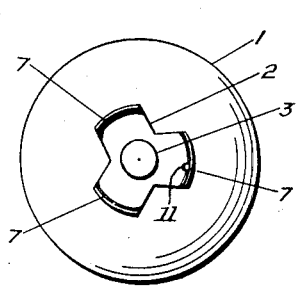
Figure 4:
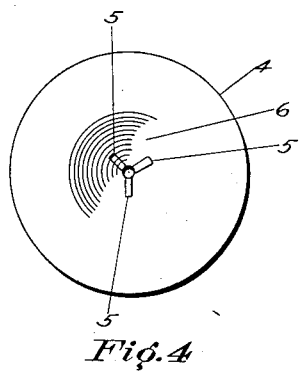
Fig. 4 shows a bottom view of the shock absorber with the shoe removed.
Figure 5:
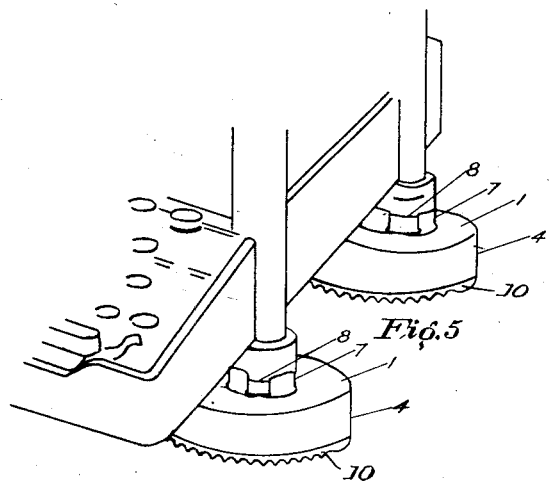
Fig. 5 shows the shock absorber as applied to a typewriting machine.

The shock absorbing pad 4 may consist of felt of superior quality, a composition of cork or similar grit free elastic material of ample thickness to raise the machine sufficiently to allow dusting underneath without the necessity of lifting the machine. Disk 1, covering the top of pad 4 completely, prevents the accumulation of dust within pad 4, thereby rendering the shock absorber sanitary. Disk 1 may be bent over on the edge, as shown at 9 in Fig. 2, thereby preserving the shape of pad 4 and still further protecting pad 4 from sifting dust.

A shoe 10 may be secured to the bottom of the pad 4, which shoe is provided with a roughened or corrugated lower surface for engaging the surface of the disk and holding the typewriter firmly so that it will not shift on the surface of the desk.

One of the lips 7 has a tooth 11 which bites into the rubber knob 8 and serves to positively hold the shock absorber on the knob.

The shock absorber may be used without the shoe 10. The shoe however more securely holds the typewriter on the surface of the desk so that it will not shift on the desk when operated.

Having described my invention I claim as new and desire to secure by Letters Patent:

1. A shock absorber comprising a pad, a clamp, a rivet extending through the central part of the pad to hold the clamp thereon, said rivet drawing the central part of the pad up and providing a central recess in the bottom of the pad, so as to distribute the weight of the typewriter to the outer portion of the pad.

2. A shock absorber comprising a pad, a plate on the top of the pad, a clamp on top of said plate, a rivet extending through said clamp, plate and pad for holding said parts together said rivet drawing the central part of the pad up and providing a central recess in the bottom of the pad.

In testimony whereof I affix my signature.

CHARLES W. ECKERMAN.